(12) United States Patent
Crawford et al.

(10) Patent No.: US 9,280,296 B2
(45) Date of Patent: Mar. 8, 2016

(54) RECOVERY FROM FAILURE OF PRIMARY STORAGE VOLUMES BY USING MIRRORED DATA MAINTAINED WITH HOST TIMESTAMPS

(71) Applicant: GLOBALFOUNDRIES U.S. 2 LLC, Hopewell Junction, NY (US)

(72) Inventors: Joshua J. Crawford, Tucson, AZ (US); Theodore T. Harris, Jr., Tucson, AZ (US); Matthew J. Kalos, Tucson, AZ (US); Gail A. Spear, Tucson, AZ (US); John G. Thompson, Tucson, AZ (US); Matthew J. Ward, Vail, AZ (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 300 days.

(21) Appl. No.: 13/901,082

(22) Filed: May 23, 2013

(65) Prior Publication Data

US 2014/0351534 A1    Nov. 27, 2014

(51) Int. Cl.
*G06F 12/16* (2006.01)
*G06F 3/06* (2006.01)

(52) U.S. Cl.
CPC ............ *G06F 3/065* (2013.01); *G06F 3/0614* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 6,535,994 | B1* | 3/2003 | Kedem | 711/114 |
| 6,842,825 | B2* | 1/2005 | Geiner et al. | 711/162 |
| 2007/0028065 | A1* | 2/2007 | Spear et al. | 711/162 |
| 2007/0294568 | A1* | 12/2007 | Kanda et al. | 714/6 |
| 2008/0243952 | A1 | 10/2008 | Webman et al. | |
| 2012/0226877 | A1 | 9/2012 | Clayton et al. | |

* cited by examiner

*Primary Examiner* — Adam M Queler
*Assistant Examiner* — Jason Blust
(74) *Attorney, Agent, or Firm* — Anthony Canale; Hoffman Warnick LLC

(57) ABSTRACT

A primary storage controller receives an input/output (I/O) command from a host, wherein a host timestamp is associated with the I/O command. During a mirroring of storage volumes to a secondary storage controller, the primary storage controller communicates the host timestamp associated with the I/O command to the secondary storage controller, wherein mirrored copies of the storage volumes are timestamped based on at least the host timestamp and an elapsed time since a last host I/O command. A recovery is made from a failure of one or more of the storage volumes in the primary storage controller, by using the timestamped mirrored copies of the storage volumes.

20 Claims, 8 Drawing Sheets

RECOVERY FROM FAILURE OF PRIMARY STORAGE VOLUMES BY USING MIRRORED DATA MAINTAINED WITH HOST TIMESTAMPS

BACKGROUND

1. Field

Embodiments relate to recovery from failure of primary storage volumes by using mirrored data maintained with host timestamps.

2. Background

Certain types of data mirroring provide data replication over extended distances between two sites for business continuity and disaster recovery. Such data mirroring may provide a recovery point objective (RPO) of as low as 1-5 seconds or less between the two sites at extended distances with marginal or no performance impact on the application at the primary site. Such mirroring replicates the data asynchronously and also forms a consistency group at a regular interval allowing a clean recovery of an application.

In certain situations, such mirroring may be achieved via a combination of asynchronous remote copy over the extended distances and point in time copy. In asynchronous remote copy storage volumes are copied from a primary storage controller to a secondary storage controller asynchronously. Once consistency groups are formed during the asynchronous remote copy, a point-in-time copy operation is performed in the secondary storage controller. A point-in-time copy is a fully usable copy of a defined collection of data that contains an image of the data as it appeared at a single point-in-time. The copy is considered to have logically occurred at that point-in-time. Implementations may perform part or all of the copy at other times as long as the result is a consistent copy of the data as it appeared at that point-in-time.

SUMMARY OF THE PREFERRED EMBODIMENTS

Provided are a method, a system, and a computer program in which a primary storage controller receives an input/output (I/O) command from a host, wherein a host timestamp is associated with the I/O command. During a mirroring of storage volumes to a secondary storage controller, the primary storage controller communicates the host timestamp associated with the I/O command to the secondary storage controller, wherein the mirrored copies of the storage volumes are timestamped based on at least the host timestamp and an elapsed time since a last host I/O command. A recovery is made from a failure of one or more of the storage volumes in the primary storage controller, by using the timestamped mirrored copies of the storage volumes.

In certain embodiments, clocks in the host and the primary storage controller indicate different times.

In further embodiments, recovering from the failure of the primary storage controller is faster when the mirrored copies are timestamped based on at least the host timestamp than with a timestamp based only on a clock of the primary storage controller.

In yet further embodiments the mirroring comprises asynchronous copy operations from the primary storage controller to the secondary storage controller to form consistency groups, and synchronous point-in-time copy operations, in response to consistency groups being formed in the secondary storage controller.

In additional embodiments, timestamping of the mirrored copies of the storage volumes is also based on a drift comprising an error in the elapsed time measured in the primary storage controller, and wherein time indicated by the primary storage controller is transferred to the secondary storage controller.

In further embodiments, the host is not queried to determine a time on the host, and the time of the host is provided via the host timestamp associated with the I/O command.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Mismatched Times Between Hosts and Primary Storage Controller

In certain embodiments, a host that interacts with a primary storage controller may indicate a time that is different from the time indicated by the primary storage controller. In certain situations, backup copies stored by a secondary storage controller (i.e., mirrored, copies of data stored in the primary storage controller) may be timestamped with the time indicated by the clock of the primary storage controller. If the mirrored copies are timestamped with the time indicated by the clock of the primary storage controller, in case of a disaster recovery scenario the host may not be able to determine from the timestamps on the mirrored copies, from which point in time to perform I/O operations that have been lost. As a result, disaster recovery may require examination of a log file that stores I/O operations that have been performed.

In certain embodiments, the mirrored copies of the data stored in the secondary storage controller are timestamped to provide an indication of the host time rather than the primary storage controller time. In such embodiments, disaster recovery from the mirrored copies of the data is significantly faster because the host is aware of the time from which I/O operations have to be performed once again.

Exemplary Embodiments

Figure 1:
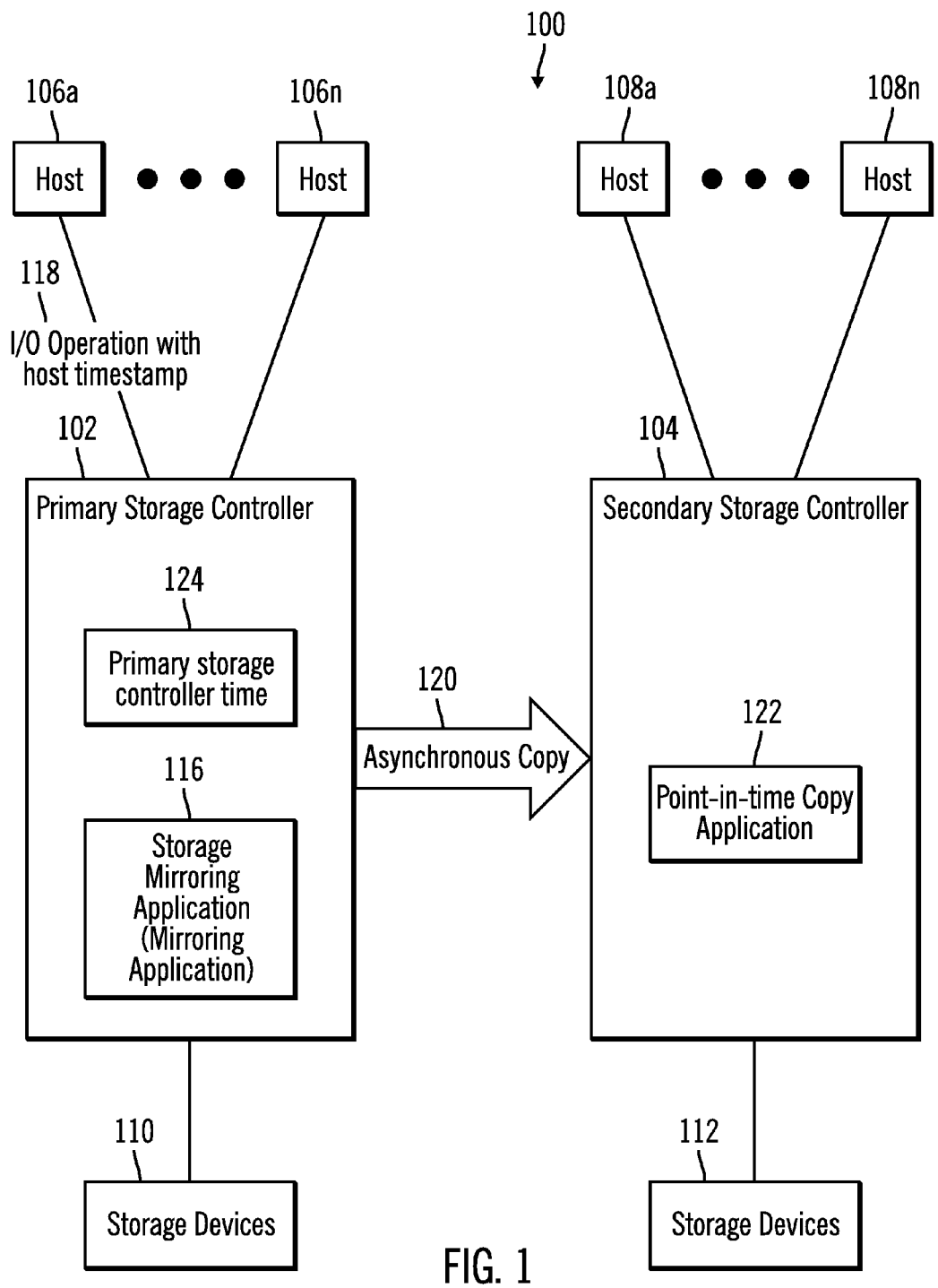
FIG. 1 illustrates a block diagram of a computing environment that includes a primary storage controller in a mirroring relationship with a secondary storage controller, in accordance with certain embodiments.

FIG. 1 illustrates a block diagram of a computing environment 100 that includes a primary storage controller 102 in a mirroring relationship with a secondary storage controller 104, in accordance with certain embodiments.

The primary storage controller 102 is coupled to a plurality of hosts 106a . . . 106n, and the secondary storage controller 104 is coupled to a plurality of hosts 108a . . . 108m, accordance with certain embodiments.

The storage controllers 102, 104 and the hosts 106a . . . 106n, 108a . . . 108m may comprise any suitable computational device including those presently known in the art, such as, a personal computer, a workstation, a server, a mainframe, a hand held computer, a palm top computer, a telephony device, a network appliance, a blade computer, a server, etc. The primary storage controller 102 may be coupled to storage devices 110 and the secondary storage controller 104 may be coupled to storage devices 112, where the storage devices may comprise any suitable storage device including those presently known in the art, such as magnetic disks, optical disks, tapes, etc. In certain embodiments, the hosts 106a . . . 106n, 108a . . . 108m, the storage controllers 102, 104 and the storage devices 110, 112 may be coupled via a network, such as the Internet, an intranet, a storage area network, a local area network, etc.

The primary storage controller 102 and the secondary storage controller 104 may control a plurality of storage volumes, where the storage volumes are logical representations of physical storage maintained in storage devices 110, 112. Data stored in the storage volumes may be represented in tracks, extents, or some other unit of storage.

The primary storage controller 102 comprises a storage mirroring application 116 wherein the storage mirroring application may also be referred to as a mirroring application.

In certain embodiments, host 106a may send an I/O operation labeled with a timestamp 118 to the primary storage controller 102 to perform an I/O operation (e.g., a read or a write) on storage volumes controlled by the primary storage controller 102. The storage mirroring application 116 may perform storage mirroring by asynchronously copying storage volumes from the primary storage controller 102 to the secondary storage controller 104. Asynchronous copying means that the copying of storage volumes to the secondary storage controller 104 does not wait for the host I/O operation to complete prior to the copying, i.e., the copying of storage volumes from the primary storage controller 102 to the secondary storage controller 104 is independent of the completion of host I/O operations.

In certain embodiments, when consistency groups are formed at a point in time in the secondary storage controller 104, the secondary storage controller 104 executes a point-in-time copy application 122 to synchronously copy the storage volumes of the consistency group. Recovery of data may be achieved from the storage volumes of the consistency group to the point in time at which the consistency group is formed. Consistency groups are formed to prevent out of order writes from the host 106a from creating inconsistent copies of storage volumes during the asynchronous copy 120.

The primary storage controller 102 has a time indicated by a primary storage controller clock or some other mechanism, and this time is referred to as a primary storage controller time 124. The primary storage controller time 124 may be different from the time in the host 106a. For example, at the same instant of time, the time of the host 106a may be 12:03:13 PM whereas the time of the primary storage controller 102 may be 12:03:43 PM. Furthermore there may be a drift of the clock within the primary storage controller 102. In other words, the primary storage controller clock 124 is not guaranteed to be 100% accurate. In fact, most digital clocks have some kind of "drift", albeit small. So if a host clock and the primary storage controller clock are synchronized on a certain date, they might be slightly out of synchronization in 6 months from that date due to clock drift of the primary storage controller clock.

In certain embodiments, in a disaster recovery scenario where primary storage volumes have been lost, the point-in-time copies from the secondary storage controller 104 may be used to restore the state of the storage volumes to the point-in-time at which the consistency group was formed. In certain embodiments, the point-in-time copies stored in the secondary storage controller 104 are labeled with a timestamp that is based on the time of the host 106a (indicated via the time of a last host I/O operation included in formation of the consistency group), an elapsed time of the primary storage controller 102, and a drift of the primary storage controller 102, during a mirroring session that forms a consistency group at a point in time.

Figure 2:
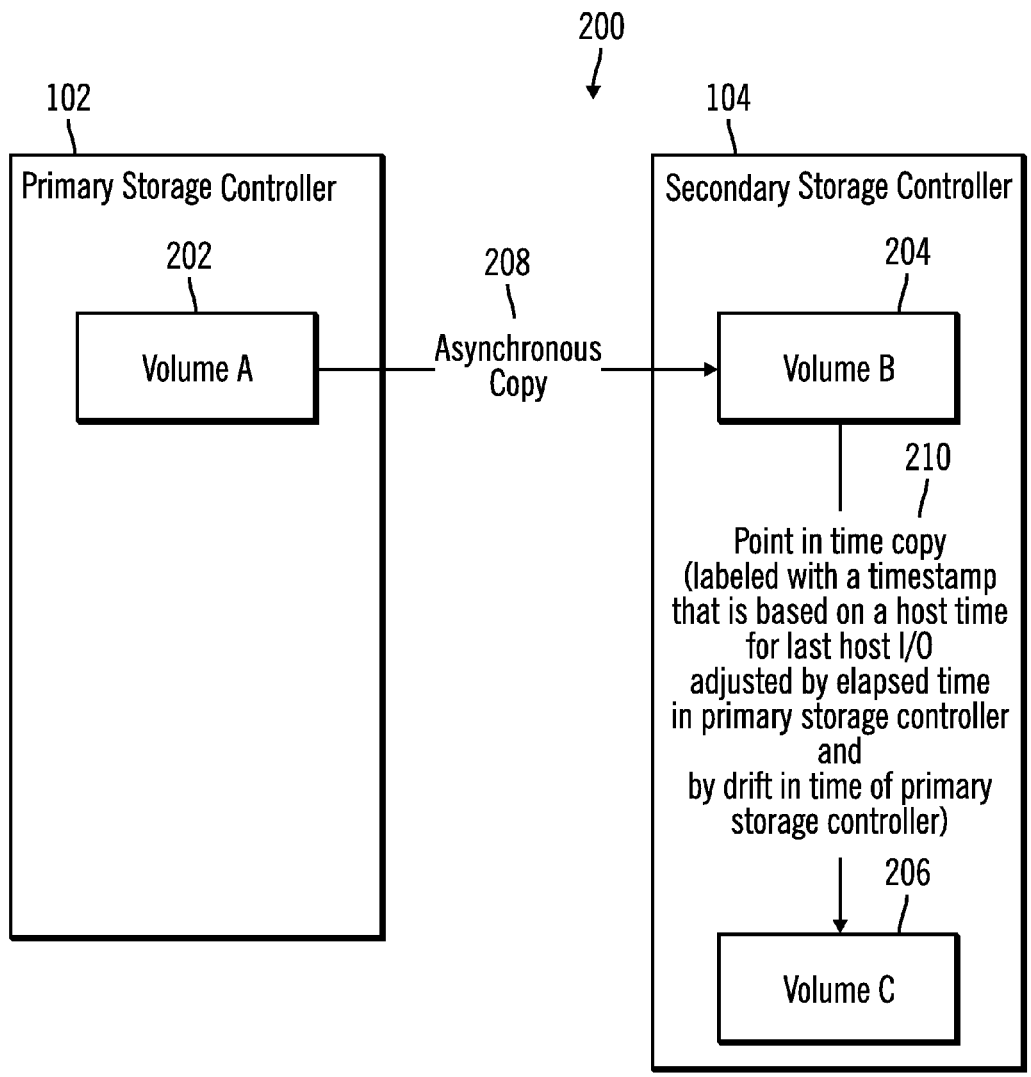
FIG. 2 illustrates a block diagram that shows how asynchronous remote copies and point-in-time copies are generated during mirroring of data and how timestamps are applied, in accordance with certain embodiments.

FIG. 2 illustrates a block diagram 200 that shows how asynchronous remote copies and point-in-time copies are generated during mirroring of data and how timestamps are applied, in accordance with certain embodiments.

FIG. 2 shows three volumes, referred to as volume A 202, volume B 204, and volume C 206. Volume A 202 is controlled by the primary storage controller 102, and volumes B 204 and C 206 are controlled by the secondary storage controller 104.

In certain embodiments, the storage mirroring application 116 that executes in the primary storage controller 102 asynchronously copies volume A 202 to volume B 204. When consistent copies of a set of storage volumes have been made via asynchronous copy 208 in the secondary storage controller 104, the point-in-time copy application 122 generates a point-in-time copy (i.e., an instantaneous synchronous copy) of volume B 204 into volume C 206. The point-in-time copy is timestamped with a time that is based on the host time of the last I/O adjusted by an elapsed time measured in the primary storage controller 102 and further adjusted by a potential drift (reference numeral 210) in the time of the primary storage controller 102. Therefore, the point-in-time copy is timestamped based at least on a host time.

Figure 3:
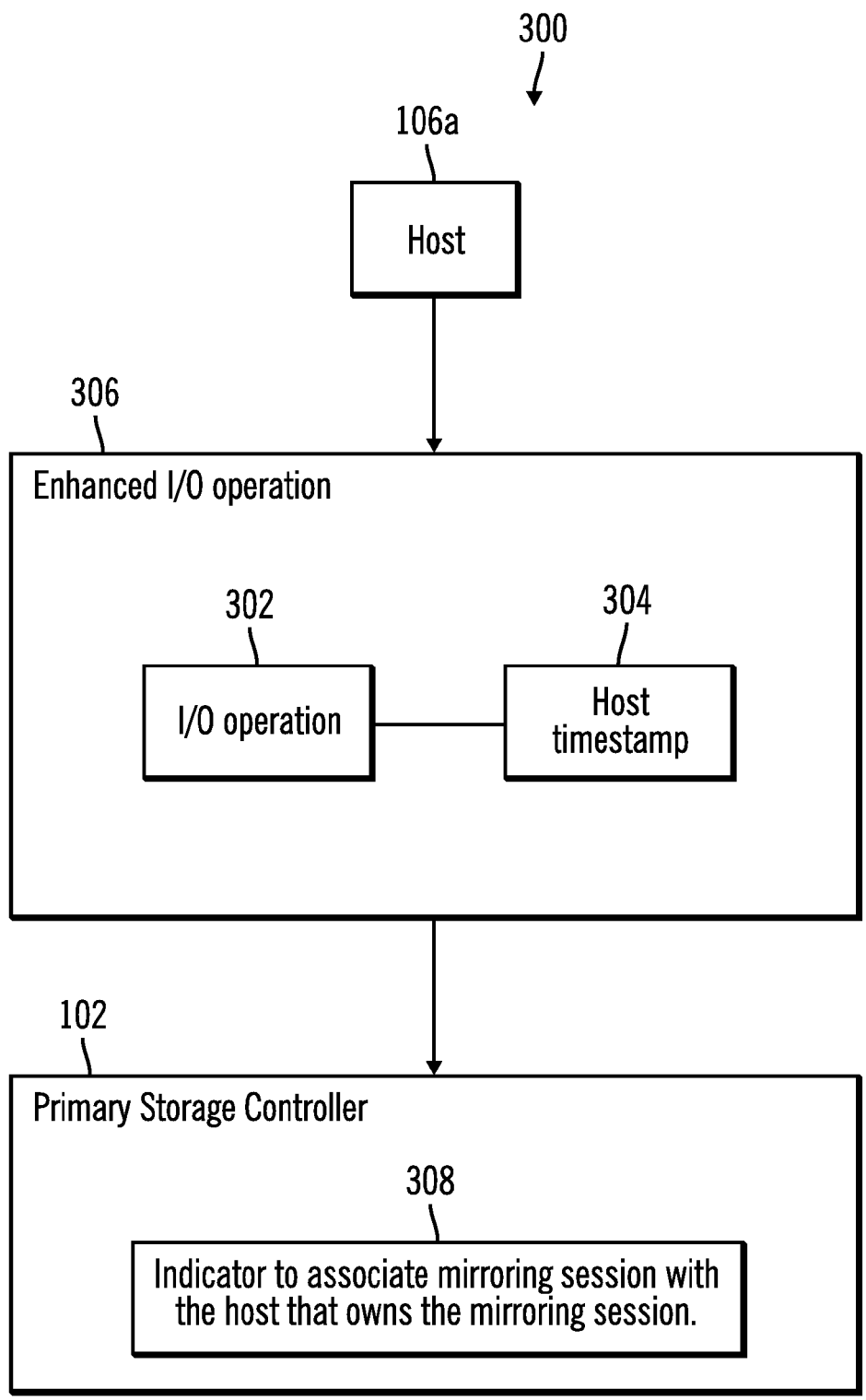
FIG. 3 illustrates a block diagram that shows how host timestamps are associated with an I/O operation and how a mirroring session indicates which host owns the mirroring session, in accordance with certain embodiments.

FIG. 3 illustrates a block diagram 300 that shows how host timestamps are associated with an I/O operation and how a mirroring session indicates which host owns the mirroring session, in accordance with certain embodiments.

In certain embodiments, when the host 106a sends an I/O operation 302 to the primary storage controller 102, a host timestamp 304 is also associated with the I/O operation 302, and such types of I/O commands may be referred to as an enhanced I/O operation 306.

When a mirroring session starts, an indicator 308 in the primary storage controller 102 associates the mirroring session with the host that owns the mirroring session. Since the I/Os are labeled with the host timestamp, the mirroring session is aware of the time of the last I/O from the host 106a, and this time of the last I/O from the host 106a is to timestamp the point-in-time copies that are stored in the secondary storage controller 104.

Figure 4:
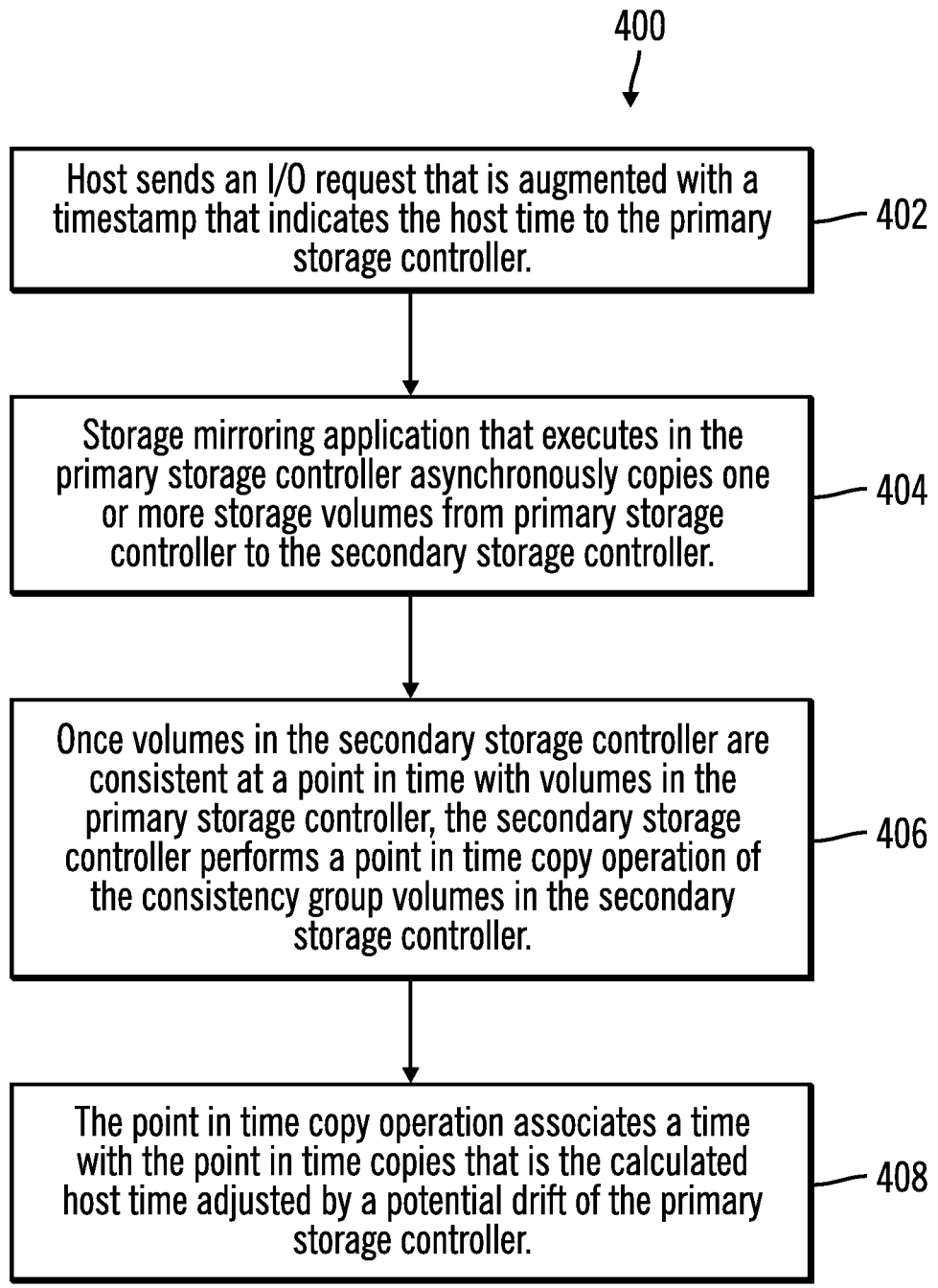
FIG. 4 illustrates a flowchart that shows first operations, in accordance with certain embodiments.

FIG. 4 illustrates a flowchart that shows first operations 400, in accordance with certain embodiments. The operations shown in FIG. 4 may be performed in the computing environment 100.

Control starts at block 402 in which the host 106a sends an I/O request that is augmented with a timestamp that indicates the host time to the primary storage controller 102. The storage mirroring application 116 that executes in the primary storage controller 102 asynchronously copies (at block 404) one or more storage volumes from the primary storage controller 102 to the secondary storage controller 104.

Control proceeds to block 406, in which once the primary storage controller 102 knows that volumes in the secondary storage controller 104 are consistent at a point in time with volumes in the primary storage controller 102, the secondary storage controller 104 performs a point-in-time copy of the storage volumes of the consistency group. The point-in-time copy operation associates (at block 408) a time with the point-in-time copies that is a calculated host time adjusted by a potential drift of the primary storage controller 102.

Figure 5:
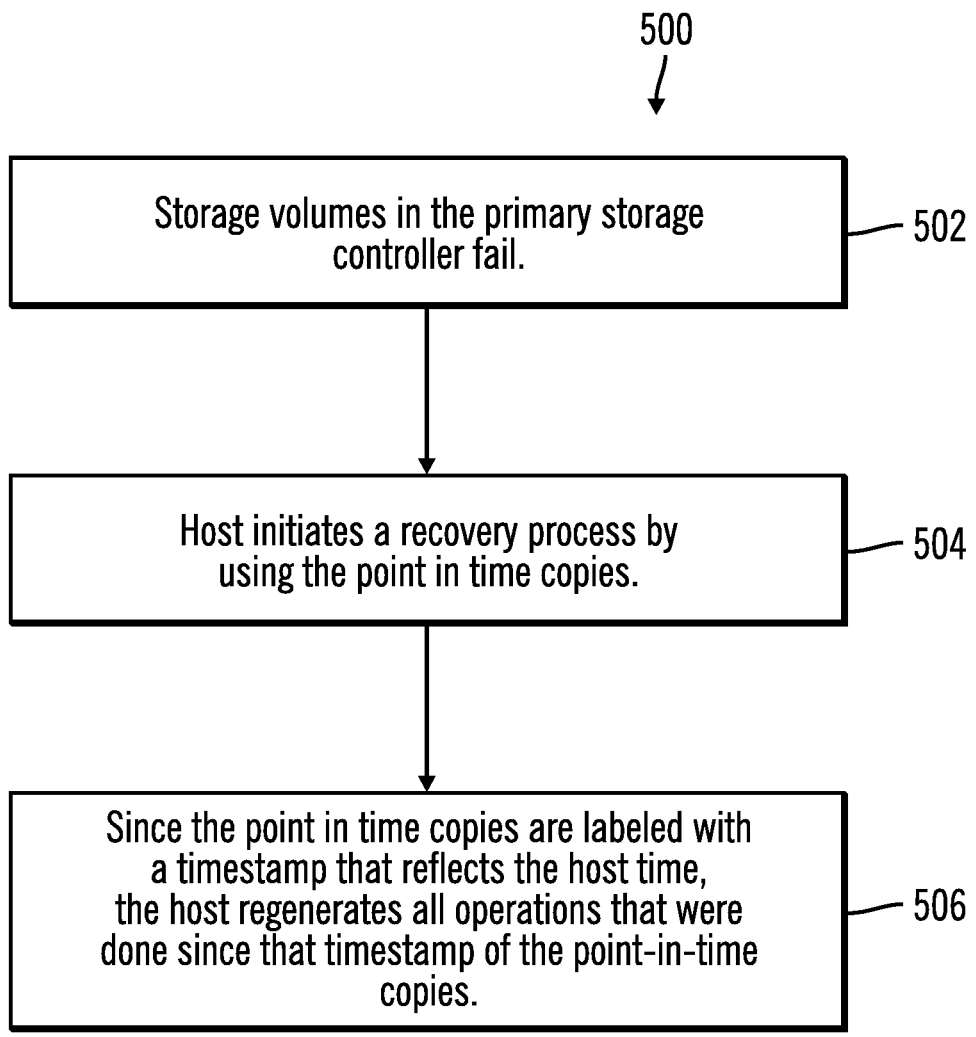
FIG. 5 illustrates a flowchart that shows second operations, in accordance with certain embodiments.

FIG. 5 illustrates a flowchart that shows second operations 500, in accordance with certain embodiments. The operations shown in FIG. 5 may be performed in the computing environment 100.

Control starts at block 502, in which one or more storage volumes in the primary storage controller 102 fail. The host 106a attempts (at block 504) a recovery process by using the point-hit-time copies that were stored in the secondary storage controller 104. Since the point-in-time copies are labeled with a timestamp that reflects the host time, the host 106a regenerates (at block 506) all operations that were done since the timestamp indicated in the point-in-time copies.

Figure 6:
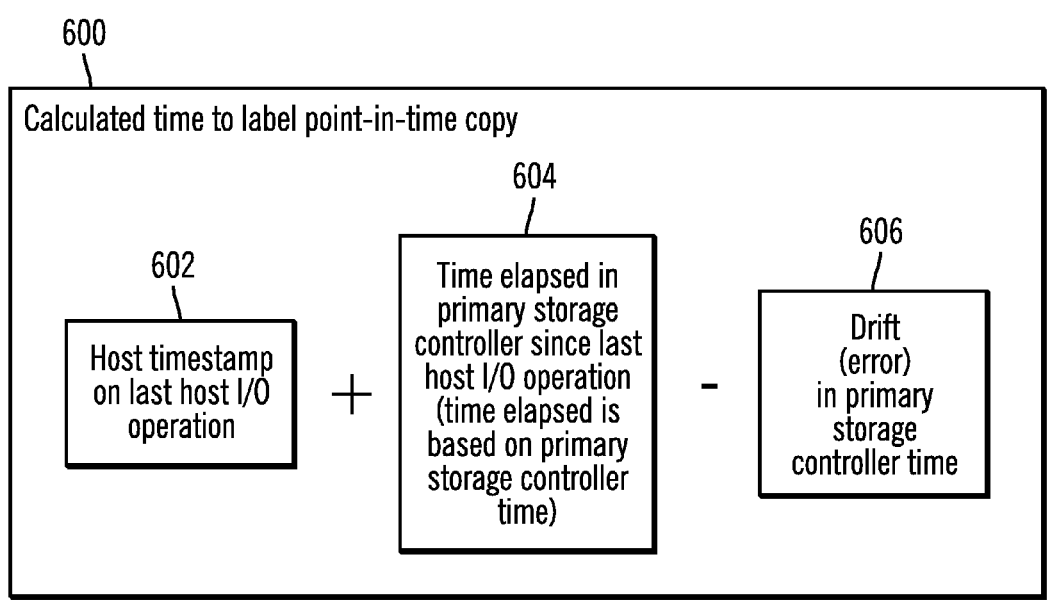
FIG. 6 illustrates a block diagram that shows how point-in-time copies are timestamped, in accordance with certain embodiments.

FIG. 6 illustrates a block diagram 600 that shows how a determination is made of the time with which point-in-time copies stored in the secondary storage controller 104 are timestamped, in accordance with certain embodiments.

The host timestamp on the last host I/O operation (reference numeral 602) is known (reference numeral 604), and host I/Os are timestamped with this information as a mirroring session has an associated host that owns the mirroring session. The time elapsed 604 in the primary storage controller 102 since the last host I/O operation is also known, where the time elapsed is measured via the clock of the primary storage controller 102. The clock of the primary storage controller may also have a drift 606 (e.g., the time shown by the clock may potentially drift, i.e., deviate, by 0.05 second during the elapsed time). To calculate the time with which to timestamp the point-in-time copy, the host timestamp on last host I/O operation 602 is added to the time elapsed in the primary storage controller 102 since the last host I/O operation 604, and the drift 606 is subtracted. As a result, the actual host time is guaranteed to be at least equal or ahead of the calculated time that is used to timestamp the point-in-time copy. For example, the calculated time may be 7 PM whereas the actual host time may be 7:01 PM. However, the actual host time cannot be 6:55 PM when the calculated time is 7 PM. It should be noted that during the mirroring the primary storage controller 102 may transmit time information to the secondary storage controller 104 to timestamp the mirrored copies stored in the secondary storage controller 104

Figure 7:
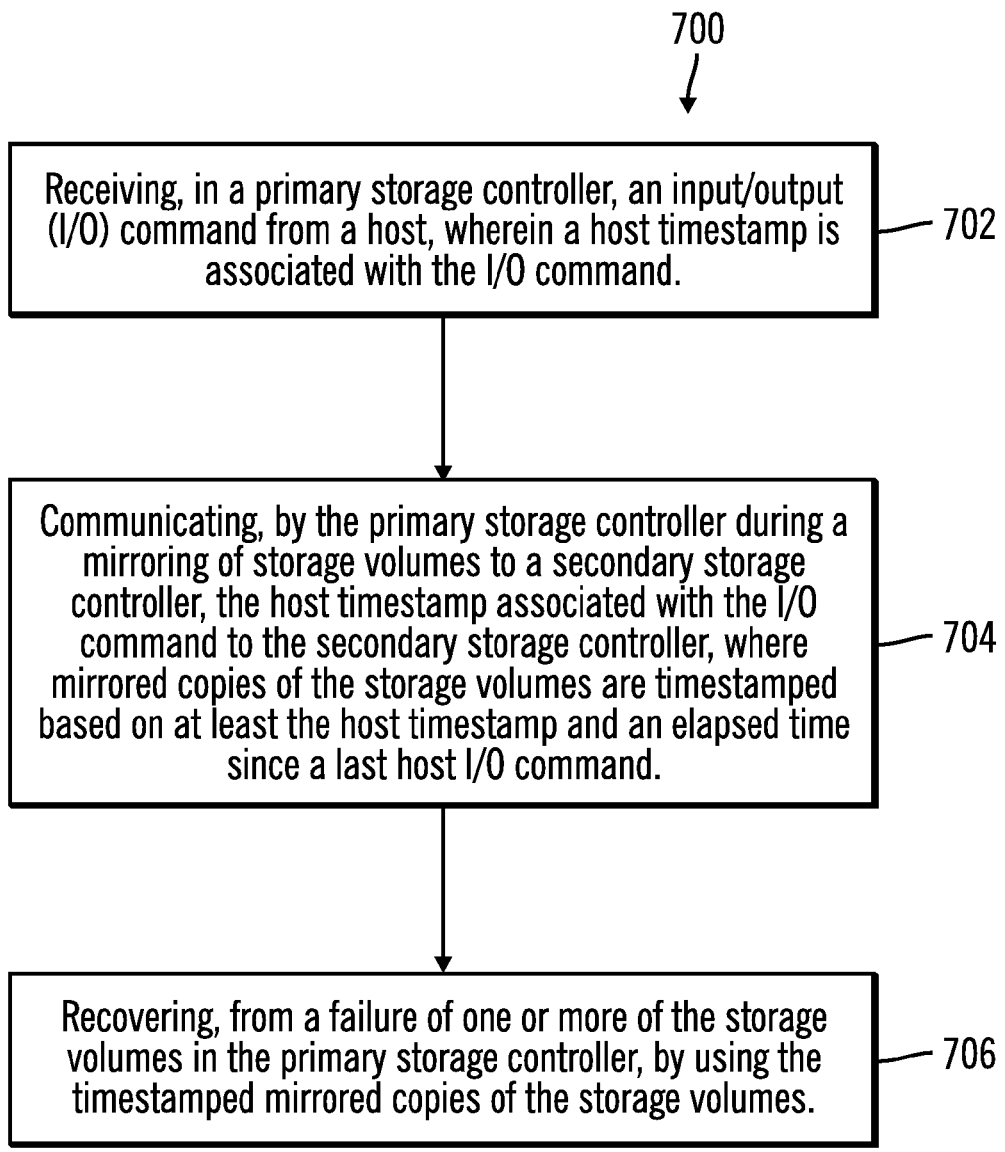
FIG. 7 illustrates a flowchart that shows third operations, in accordance with certain embodiments.

FIG. 7 illustrates a flowchart that shows third operations 700, in accordance with certain embodiments. The operations shown in FIG. 7 may be performed in the computing environment 100.

Control starts at block 702, in which a primary storage controller 102 receives an input/output (I/O) command from a host 106a, wherein a host timestamp is associated with the I/O command. During a mirroring of storage volumes to a secondary storage controller 104, the primary storage controller 102 communicates the host timestamp associated with the I/O command to the secondary storage controller 104, wherein mirrored copies of the storage volumes are timestamped based on at least the host timestamp and an elapsed time since a last host I/O command (block 704).

Control proceeds to block 706, in which a recovery is made from a failure of one or more of the storage volumes in the primary storage controller 102, by using the timestamped mirrored copies of the storage volumes.

Therefore FIGS. 1-7 illustrates certain embodiments in which by using the host time to timestamp the mirrored copies, recovery from failure in primary storage volumes is faster, in comparison to situations in which the mirrored copies are timestamped with the time of storage controller.

Further Details of Certain Embodiments

In some z/OS* configurations it is desirable to use Global Mirror* (GM), i.e., storage mirroring also referred to as mirroring. In the event of a disaster, the controlling software needs to understand when the consistency groups were formed, in order to resynchronize the copies of the workload. The problem is that the consistency group timestamps from mirroring are relative to the sysplex clock and the Global Mirror consistency time stamps are relative to the DS8K* (a type of storage controller) clock, and there is no correlation between the two.

In order to make the Global Mirror consistency time meaningful to managing storage, Global Mirror may use an estimated sysplex time when forming consistency groups. This time may be assigned as the Flashcopy* (i.e., point-in-time copy) sequence number which can be queried at the disaster recovery site. To achieve this, the following is needed:

*z/OS, Global Mirror, FlashCopy, DS8K are trademarks or registered trademarks of IBM corporation.

1) A Global Mirror session needs to be aware of which sysplex it is tied to; and
2) A Global Mirror session needs to be aware of the current sysplex time.

The sysplex time is provided in I/Os from host systems in the sysplex. The majority of I/O's already carry the sysplex timestamp. The timestamp in the I/O's is used to keep the DS8K in synchronization with the sysplex clock. There is no way to guarantee every I/O which comes into a particular DS8K comes from the same sysplex. Therefore, it is not safe to arbitrarily select which I/Os to examine for the sysplex time. In order to determine whether an I/O is carrying the correct sysplex time, the DS8K needs a way to validate whether the timestamp was generated by the expected sysplex. To achieve this, the sysplex may supply the sysplex name in a Set System Characteristics (SSC) data structure. On a per I/O basis, the sysplex name in the SSC and the sysplex name supplied to the GM session can be compared to see if the time in the I/O can be used as the sysplex time for the session.

At the time the sequence number (timestamp) is calculated by the storage controller it should never be greater than the time at the same moment on the host (indicated by its clock). A time that is slightly earlier is alright since it will just require some data to be recovered that may not need to be. This is accomplished in the storage controller during the calculation by the storage controller by always assuming the maximum drift of the storage controller and host clocks.

Certain embodiments handle drift between the DS8K and sysplex clocks. Certain embodiments continue to estimate a sysplex time even when one has not been received from the sysplex for any extended amount of time. Furthermore, certain embodiments, dynamically calculate the DS8K clock format given the host can provide a clock format unique to that given host.

Given that certain embodiments can have multiple GM sessions, a requirement exists that each GM session can have a unique host owning it. Each session can store and calculate time stamps independently based on only time stamps received from the owning host.

In certain embodiments, when the customer defines the Global Mirror session they are required to supply via the start command a flag that indicates if they want to use the host's time stamp or the legacy DS8K timestamps for their copy sequence numbers (i.e. timestamps). The FlashCopy sequence numbers indicate to what time data is consistent to. If they indicate they want the host's time stamps used the customer is also required to enter a hostname that this Global Mirror session will accept time stamps from.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
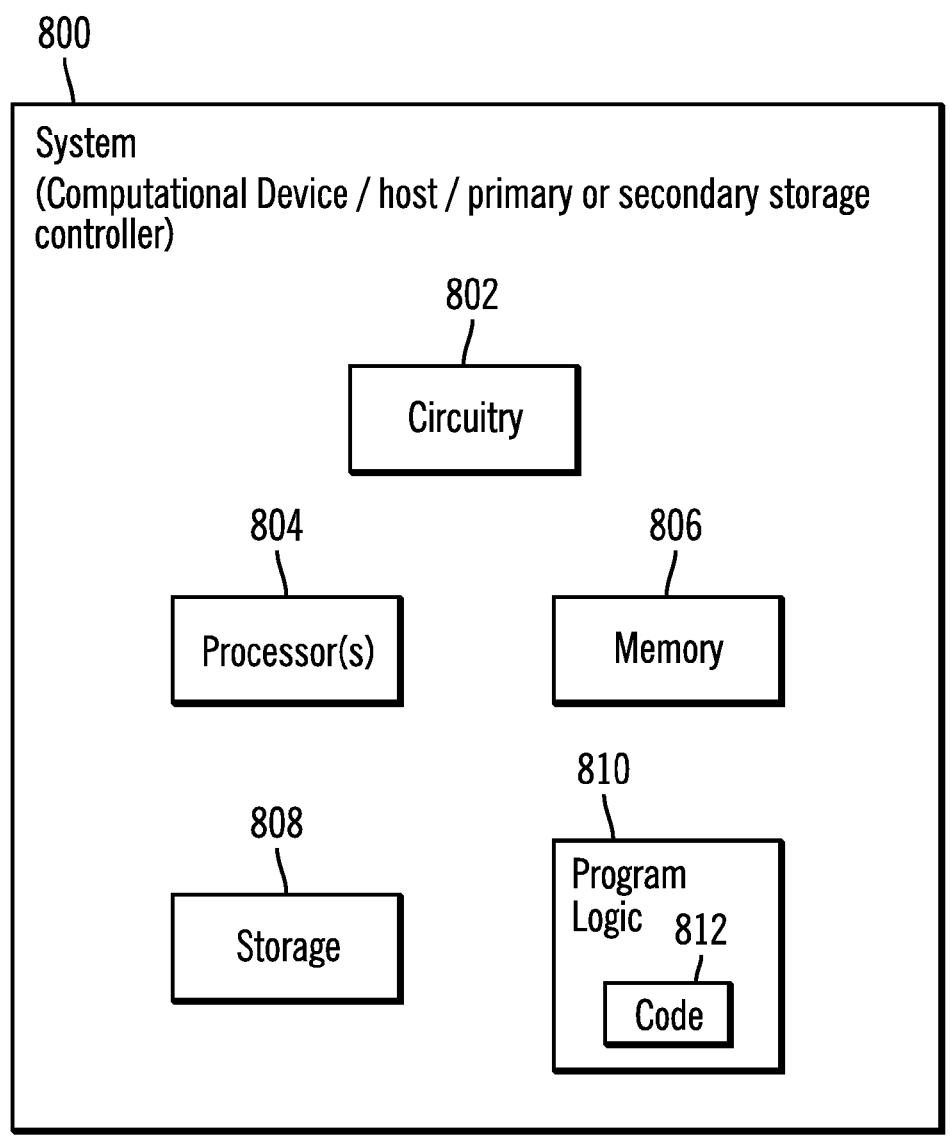
FIG. 8 illustrates a block diagram of a computational system that shows certain elements that may be included in the primary or secondary storage controller or any of the hosts of FIG. 1, in accordance with certain embodiments.

FIG. 8 illustrates a block diagram that shows certain elements that may be included in the storage controllers 102, 104 or the hosts 106a ... 106n, 106a ... 106m in accordance with certain embodiments. The system 800 may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment" "embodiments", "the embodiment", "the embodiments". "one or more embodiments" "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
receiving, in a primary storage controller, an input/output (I/O) command from a host, wherein a host timestamp is associated with the I/O command;
communicating, by the primary storage controller during a mirroring of storage volumes to a secondary storage controller, the host timestamp associated with the I/O command to the secondary storage controller, wherein the mirrored copies of the storage volumes are timestamped with a time that is calculated by adding the host timestamp on a last host I/O operation to time elapsed in primary storage controller since the last host I/O operation and subtracting a drift of a clock of the primary storage controller, wherein the drift comprises an error in the time elapsed in the in the primary storage controller; and
recovering, from a failure of one or more of the storage volumes in the primary storage controller, by using the timestamped mirrored copies of the storage volumes.

2. The method of claim 1, wherein clocks in the host and the primary storage controller indicate different times.

3. The method of claim 1, wherein the mirroring comprises:
asynchronous copy operations from the primary storage controller to the secondary storage controller to form consistency groups; and
synchronous point-in-time copy operations, in response to consistency groups being formed in the secondary storage controller.

4. The method of claim 1, wherein the time elapsed is based on the clock of the primary storage controller, and wherein time indicated by the primary storage controller is transferred to the secondary storage controller.

5. The method of claim 1, wherein the host is not queried to determine a time on the host, and the time of the host is provided via the host timestamp associated with the I/O command.

6. The method of claim 1, wherein at an identical time a clock of the host indicates a different time than a clock of the primary storage controller.

7. The method of claim 1, wherein an actual time of the host is at least equal to or ahead of the calculated time that is used to timestamp the mirrored copies of the storage volumes.

8. A system, comprising:
a memory; and
a processor coupled to the memory, wherein the processor performs operations, the operations comprising:
receiving, in a primary storage controller, an input/output (I/O) command, wherein a host timestamp is associated with the I/O command;

communicating, by the primary storage controller during a mirroring of storage volumes to a secondary storage controller, the host timestamp associated with the I/O command to the secondary storage controller, wherein mirrored copies of the storage volumes are timestamped with a time that is calculated by adding the host timestamp on a last host I/O operation to time elapsed in primary storage controller since the last host I/O operation and subtracting a drift of a clock of the primary storage controller, wherein the drift comprises an error in the time elapsed in the in the primary storage controller; and recovering, from a failure of one or more of the storage volumes in the primary storage controller, by using the timestamped mirrored copies of the storage volumes.

9. The system of claim 8, wherein clocks in the host and the primary storage controller indicate different times.

10. The system of claim 8, wherein the mirroring comprises:
asynchronous copy operations from the primary storage controller to the secondary storage controller to form consistency groups; and
synchronous point-in-time copy operations, in response to consistency groups being formed in the secondary storage controller.

11. The system of claim 8, wherein the time elapsed is based on the clock of the primary storage controller, and wherein time indicated by the primary storage controller is transferred to the secondary storage controller.

12. The system of claim 8, wherein the host is not queried to determine a time on the host, and the time of the host is provided via the host timestamp associated with the I/O command.

13. The system of claim 8, wherein at an identical time a clock of the host indicates a different time than a clock of the primary storage controller.

14. The system of claim 8, wherein an actual time of the host is at least equal to or ahead of the calculated time that is used to timestamp the mirrored copies of the storage volumes.

15. A computer program product, the computer program product comprising:
a non-transitory computer readable storage medium having computer readable program code embodied therewith, the computer readable program code configured to perform operations on a processor, the operations comprising:
receiving, in a primary storage controller, an input/output (I/O) command from a host, wherein a host timestamp is associated with the I/O command;
communicating, by the primary storage controller during a mirroring of storage volumes to a secondary storage controller, the host timestamp associated with the I/O command to the secondary storage controller, wherein mirrored copies of the storage volumes are timestamped with a time that is calculated by adding the host timestamp on a last host I/O operation to time elapsed in primary storage controller since the last host I/O operation and subtracting a drift of a clock of the primary storage controller, wherein the drift comprises an error in the time elapsed in the in the primary storage controller; and
recovering, from a failure of one or more of the storage volumes in the primary storage controller, by using the timestamped mirrored copies of the storage volumes.

16. The computer program product of claim 15, wherein clocks in the host and the primary storage controller indicate different times.

17. The computer program product of claim 15, wherein the mirroring comprises:
asynchronous copy operations from the primary storage controller to the secondary storage controller to form consistency groups; and
synchronous point-in-time copy operations, in response to consistency groups being formed in the secondary storage controller.

18. The computer program product of claim 15, wherein the time elapsed is based on the clock of the primary storage controller, and wherein time indicated by the primary storage controller is transferred to the secondary storage controller.

19. The computer program product of claim 15, wherein at an identical time a clock of the host indicates a different time than a clock of the primary storage controller.

20. The computer program product of claim 15, wherein an actual time of the host is at least equal to or ahead of the calculated time that is used to timestamp the mirrored copies of the storage volumes.

* * * * *

UNITED STATES PATENT AND TRADEMARK OFFICE
CERTIFICATE OF CORRECTION

PATENT NO. : 9,280,296 B2
APPLICATION NO. : 13/901082
DATED : March 8, 2016
INVENTOR(S) : Crawford et al.

It is certified that error appears in the above-identified patent and that said Letters Patent is hereby corrected as shown below:

In the drawings, Sheet 1, Fig. 1, the reference numeral "108n" should read --108m--.

Signed and Sealed this
Twenty-eighth Day of June, 2016

Michelle K. Lee
*Director of the United States Patent and Trademark Office*